United States Patent
Bono

(10) Patent No.: US 8,017,277 B2
(45) Date of Patent: Sep. 13, 2011

(54) FUEL CELL SYSTEM

(75) Inventor: Tetsuya Bono, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1152 days.

(21) Appl. No.: 11/579,086

(22) PCT Filed: Apr. 28, 2005

(86) PCT No.: PCT/JP2005/008570
§ 371 (c)(1),
(2), (4) Date: Oct. 30, 2006

(87) PCT Pub. No.: WO2005/112170
PCT Pub. Date: Nov. 24, 2005

(65) Prior Publication Data
US 2007/0243426 A1   Oct. 18, 2007

(30) Foreign Application Priority Data

May 19, 2004   (JP) .................................. 2004-148611

(51) Int. Cl.
*H01M 8/04* (2006.01)

(52) U.S. Cl. ........ 429/444; 429/428; 429/429; 429/445; 429/446

(58) Field of Classification Search ..................... 429/13, 429/22, 25, 34, 428, 429, 444, 445, 446
See application file for complete search history.

(56) References Cited

U.S. PATENT DOCUMENTS

| | | | |
|---|---|---|---|
| 2002/0094469 A1* | 7/2002 | Yoshizumi et al. | 429/34 |
| 2002/0289237 | 7/2002 | Yoshizumi et al. | |
| 2003/0077488 A1 | 4/2003 | Yamamoto et al. | |
| 2004/0013919 A1* | 1/2004 | Ueda et al. | 429/22 |

FOREIGN PATENT DOCUMENTS

| | | |
|---|---|---|
| JP | A 4-209469 | 7/1992 |
| JP | A 7-192743 | 7/1995 |
| JP | A 2000-348743 | 12/2000 |
| JP | A 2002-134139 | 5/2002 |
| JP | A 2002-289237 | 10/2002 |
| JP | A 2002-373682 | 12/2002 |
| JP | A 2002-373685 | 12/2002 |
| JP | A 2002-373697 | 12/2002 |
| JP | A 2003-132915 | 5/2003 |

* cited by examiner

*Primary Examiner* — Melvin Curtis Mayes
*Assistant Examiner* — Kevin Johnson
(74) *Attorney, Agent, or Firm* — Oliff & Berridge, PLC

(57) ABSTRACT

An object is to provide a fuel cell system capable of suitably avoiding damage to the equipment caused by abnormally high pressure of fuel gas and appropriately discharge fuel gas at a safe concentration to the outside. The fuel cell system (1) includes a fuel gas passage (38) that feeds fuel gas to a fuel cell (2), a relief valve (57) that is provided in the fuel gas passage (38) and discharges fuel gas to the outside when fuel gas in the fuel gas passage (38) is pressurized to a predetermined pressure or higher, an external discharge passage (59) that is provided on the gas discharge side of the relief valve (57), and a gas processing device (19) that is provided in the external discharge passage (59) and reduces the concentration of fuel gas discharged from the relief valve (57).

6 Claims, 4 Drawing Sheets

FUEL CELL SYSTEM

BACKGROUND

The present invention relates to a fuel cell system in which a relief valve is provided in a fuel gas passage through which fuel gas typified by hydrogen gas flows.

As such a fuel cell system, there is conventionally known the one in which a and a fuel cell (see Japanese Patent Application Laid-Open No. 2002-134139 (Pg. 4 and FIG. 1), for example). This relief valve is mechanically opened when the fuel gas in the fuel gas passage is pressurized to a predetermined pressure or higher, and discharges the fuel gas from the fuel gas passage to the outside atmosphere.

Such a conventional fuel system is effective in terms of using the relief valve to prevent damage to the fuel cell and the system component, which is caused by abnormally increased pressure. However, after-treatments on the fuel gas discharged from the relief valve are not taken at all into consideration, hence the periphery of the discharge points may be changed to the atmosphere having high concentrations of the fuel gas.

SUMMARY

An object of the present invention is to provide a fuel cell system capable of discharging fuel gas at a safe concentration to the outside appropriately, when fuel gas is pressurized to abnormally high pressure.

In order to solve the above problem, the fuel cell system of the present invention includes: a fuel gas passage that feeds fuel gas to a fuel cell; a relief valve that is provided in the fuel gas passage and discharges fuel gas to the outside when fuel gas in the fuel gas passage is pressurized to a predetermined pressure or higher; an external discharge passage that is provided on a gas discharge side of the relief valve; and a gas processing device that is provided in the external discharge passage and reduces the concentration of fuel gas discharged from the relief valve.

According to this configuration, since the relief valve is provided in the fuel gas passage, excess pressure of the fuel gas can be allowed to escape and various system components including the fuel cell can be protected appropriately. Moreover, fuel gas, which is discharged from the relief valve, is led into the external discharge passage, whereby the concentration of fuel gas is reduced by the gas processing device provided in the external discharge passage. Accordingly, fuel gas at a safe concentration can be discharged to the outside.

Here, "fuel gas passage" has a feed passage for feeding new fuel gas to the fuel cell, and a circulation passage for supplying fuel off-gas, which is emitted from the fuel cell, to the fuel cell again. Fuel gas is generally hydrogen gas. A fuel cell vehicle is representative of the equipment installed with such a fuel cell system.

According to an aspect of the present invention, it is preferred that the gas processing device comprise a diluting device for diluting fuel gas or an oxidation device for combusting fuel gas.

According to this configuration, the concentration of fuel gas can be reduced reliably by the diluting device or the oxidation device. Moreover, generally these types of diluting device and the like are provided in an emission passage that branches off from the circulation passage for fuel off-gas, thus this diluting device and the like can be effectively used to process the relieved fuel off-gas.

Preferably, the gas processing device is configured so as to be able to introduce diluent gas for reducing the concentration of fuel gas.

According to this configuration, the concentration of fuel gas can be reduced appropriately using, as the diluent gas, not only oxygen gas or oxygen off-gas but also special inert gas or secondary air that is not fed to the fuel cell.

Preferably, the diluent gas is oxygen gas that is fed to the fuel cell.

According to this configuration, it is not necessary to use the special inert gas or secondary air, which is not fed to the fuel cell, in order to process fuel gas. Specifically, by effectively using oxygen gas that is fed to the fuel cell, the relieved fuel gas can be processed without a complex configuration.

Preferably, the gas processing device is configured so as to be able to introduce oxygen off-gas emitted from the fuel cell out of the oxygen gas.

According to this configuration, a simple configuration can be provided.

Preferably, the fuel cell system further includes: oxygen gas supply means for pressure-conveying oxygen gas to the fuel cell; and a control device that drives the oxygen gas supply means to introduce oxygen gas into the gas processing device when the relief valve is opened.

According to this configuration, since the oxygen gas supply means is driven when the relief valves is opened, oxygen gas can be introduced into the gas processing device reliably, and the process of fuel gas can be performed reliably using oxygen gas. It should be noted that the control device may drive the oxygen gas supply means in response to the relieved amount of fuel gas or may drive the oxygen gas supply means at constant operation regardless of the relieved amount of fuel gas (may drive the oxygen gas supply means at the maximum rotation speed if, for example, the oxygen gas supply means is a compressor).

Preferably, the fuel cell system further includes pressure detecting means provided in the fuel gas passage, for detecting the pressure of fuel gas in the fuel gas passage. The control device drives the oxygen gas supply means when the pressure detecting means detects that the pressure of fuel gas corresponds to the predetermined pressure for the relief valve.

According to this configuration, the oxygen gas supply means can be driven appropriately based on the pressure detecting means.

Preferably, the fuel cell system further includes: a gas supply source that is provided at an upstream end of the fuel gas passage and that has fuel gas stored inside; and a shut-off valve that is provided in the fuel gas passage on a downstream side of the gas supply source, which is an upstream side of the relief valve, and that is opened and closed by the control device, wherein the control device also controls closing of the shut-off valve when the pressure detecting means detects that the pressure of fuel gas corresponds to the predetermined pressure for the relief valve.

According to this configuration, since the shut-off valve, which can be a source valve, is closed based on the pressure detecting means, discharge of fuel gas from the gas supply source or the relief valve can be restrained appropriately.

Preferably, the fuel cell system further includes: an emission passage that branches off from the fuel gas passage and emits fuel off-gas, which is emitted from the fuel cell, to the outside; and a purge valve that is provided in the emission passage and opens and closes the emission passage, wherein the emission passage causes a downstream side of the purge valve to join an upstream side of the gas processing device in the external discharge passage.

Generally, both of fuel off-gas emitted from the purge valve and fuel gas discharged from the relief valve need to be subjected to a concentration reduction process in order to be discharged to the outside. By causing the emission passage and the external discharge passage to merge with each other on the basis of the above configuration, it is not necessary to provide the gas processing device specially for each gas. Specifically, fuel gas whose concentration needs to be reduced can be processed appropriately without complicating the entire system.

Preferably, the fuel gas passage to which the emission passage is connected is the circulation passage.

Another fuel cell system according to the present invention includes: a fuel gas passage that feeds fuel gas to a fuel cell; a relief valve that is provided in the fuel gas passage and discharges fuel gas to the outside when fuel gas in the fuel gas passage is pressurized to a predetermined pressure or higher; an emission passage that branches off from the fuel gas passage and emits fuel gas, which is emitted from the fuel cell, to the outside; a purge valve that is provided in the emission passage and opens and closes the emission passage; a gas processing device that is provided on a downstream side of the purge valve in the emission passage and reduces the concentration of fuel gas; pressure detecting means provided in the fuel gas passage, for detecting the pressure of fuel gas in the fuel gas passage; and a control device that controls opening and closing of the purge valve based on the pressure detecting means, wherein the control device controls the opening of the purge valve when the pressure detecting means detects reference pressure that is set lower than the predetermined pressure of fuel gas.

According to this configuration, the purge valve is opened by the control device at the reference pressure that is lower than the predetermined pressure of fuel gas at which the relief valve is opened. Therefore, in the case where an abnormal pressure increase occurs in the fuel gas passage when the pressure is monitored by the pressure detecting means, the purge valve is opened prior to the relief valve.

Accordingly, excess pressure of fuel gas can be allowed to escape by means of the purge valve and various system components including the fuel cell can be protected appropriately. Moreover, since the gas processing device is provided on the downstream side of the purge valve, fuel gas, which is discharged from the purge valve, can be processed and fuel gas in safe concentration can be emitted to the outside. Furthermore, the relief valve is configured so as to be opened preliminary only when a pressure increase cannot be avoided even when the purge valve is opened. However, since fuel gas is discharged by the relief valve in advance, the concentration of the periphery of the discharge points does not have to be increased to a relatively high level even if the relief valve is opened.

According to an aspect of the present invention, the fuel cell system further includes the external discharge passage provided on the gas discharge side of the relief valve, wherein the external discharge passage preferably joins the emission passage on the upstream side of the gas processing device.

According to this configuration, even when the relief valve is activated, fuel gas, which is discharged from the relief valve, is sent to the gas processing device via the external discharge passage, thus fuel gas at a safe concentration can be discharged reliably to the outside.

Preferably, the gas processing device is configured so as to be able to introduce diluent gas for reducing the concentration of fuel gas.

According to this configuration, as with the same manner described above, the concentration of fuel gas can be reduced appropriately using oxygen gas, oxygen off-gas, special inert gas, secondary air, or the like as diluent gas.

Preferably, diluent gas is oxygen gas that is fed to the fuel cell.

According to this configuration, as with the same manner described above, fuel gas can be processed without using the special inert gas or the secondary air that is not fed to the fuel cell.

Preferably, the fuel cell system further includes oxygen gas supply means for pressure-conveying oxygen gas to the fuel cell, wherein the control device drives the oxygen gas supply means to introduce oxygen gas to the gas processing device in synchronization with control of the opening of the purge valve.

According to this configuration, since the oxygen gas supply means is driven when the purge valve is opened, oxygen gas can be introduced reliably into the gas processing device and processing of the fuel gas can be reliably performed using oxygen gas.

Preferably, the fuel cell system further includes: a gas supply source that is provided at an upstream end of the fuel gas passage and has fuel gas stored inside; and a shut-off valve that is provided in the fuel gas passage on a downstream side of the gas supply source and is opened and closed by the control device, wherein the control device also controls the closing of the shut-off valve when the pressure detecting means detects the reference pressure.

According to this configuration, the shut-off valve, which can be a source valve, is closed when opening the purge valve, thus fuel gas can be prevented from flowing out from the gas supply source to the fuel gas passage. Fuel gas can be discharged appropriately from the purge valve.

As described above, according to the fuel cell system of the present invention, in the case where the pressure of fuel gas in the fuel gas passage is increased abnormally and the relief valve is opened, the relieved fuel gas is processed by the gas processing device, thus fuel gas at a safe concentration can be discharged appropriately to the outside.

DETAILED DESCRIPTION

The fuel cell system according to preferred embodiments of the present invention is described with reference to the attached drawings. In this fuel cell system, a relief valve is disposed in a fuel gas passage through which fuel gas is fed, a gas processing device such as a diluting device is disposed on a downstream side of the relief valve, the concentration of fuel gas discharged from the relief valve can be reduced, and thus obtained fuel gas can be discharged to the outside. Hereinafter, the entire configuration of the fuel cell system is described first using hydrogen gas as an example of fuel gas, and then a method of controlling various assemblies used when relieving hydrogen gas is explained as other embodiments.

Embodiment 1

Figure 1:
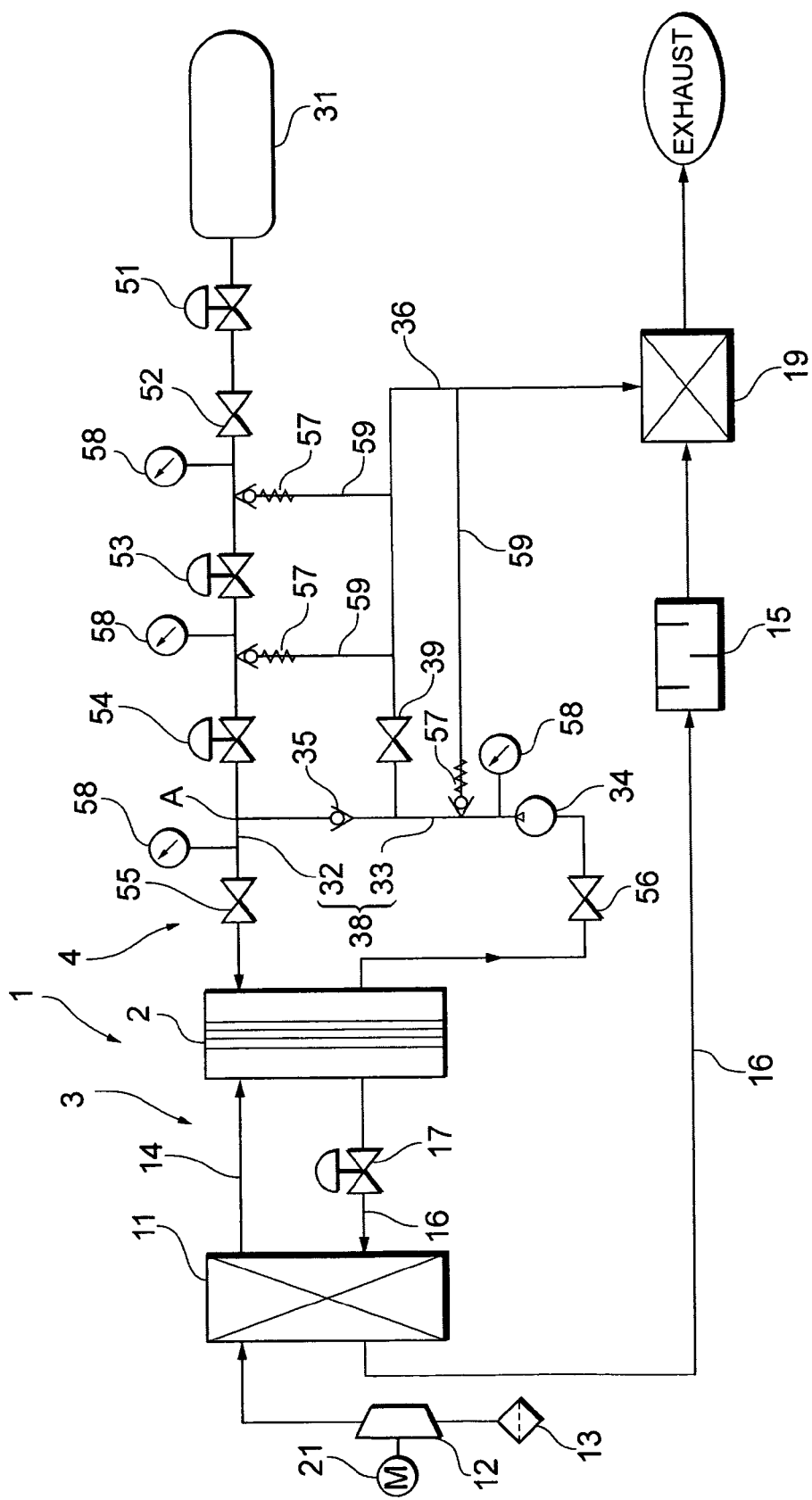
FIG. 1 is a configuration diagram showing a configuration of a fuel cell system according to Embodiment 1.

As shown in FIG. 1, a fuel cell system 1 includes a solid molecular electrolyte type fuel cell 2, which receives supply of oxygen gas (air) and hydrogen gas and generates power. The fuel cell 2 has a stack structure which is formed by stacking a plurality of cells. The fuel cell system 1 also includes an oxygen gas piping system 3 for supplying oxygen gas to the fuel cell 2 and a hydrogen gas piping system 4 for supplying hydrogen gas to the fuel cell 2.

The oxygen piping system 3 includes: a compressor 12 (oxygen gas supply means) that takes in oxygen gas in the atmosphere and pumps it to a humidifier 11; a filter 13 that filters dust and the like in oxygen gas taken in by the compressor 12; a feed passage 14 that supplies oxygen gas humidified by the humidifier 11 to the fuel cell 2; an emission passage 16 that leads oxygen off-gas emitted from the fuel cell 2 to a silencer 15 via the humidifier 11; and a back pressure regulating valve 17 that is provided on an upstream side of the humidifier 11 in the emission passage 16.

The compressor 12 has a motor 21 that is a driving source. The drive of the motor 21 is controlled by a control device 5 (control means) shown in FIG. 2. The compressor 12 can increase the flow volume of oxygen gas pumped to the fuel cell 2 and the flow volume of oxygen off-gas emitted from the fuel cell 2 by increasing the rotation speed of the motor 21. The back pressure regulating valve 17 is connected to the control device 5 and adjusts the pressure of oxygen gas in the fuel cell 2 by adjusting the flow volume of oxygen off-gas.

The humidifier 11 exchanges water vapor between oxygen gas that is already filtered and oxygen off-gas. Oxygen off-gas obtained after the water vapor exchange is caused to pass through the emission passage 16 and sent to the silencer 15. Oxygen off-gas, which is subjected to sound reduction by the silencer 15, is led to a gas processing device 19 that is disposed in the emission passage 16 on a downstream side of the silencer 15. As described hereinafter, the gas processing device 19 reduces the concentration of hydrogen gas or hydrogen off-gas by using oxygen off-gas. The gas processed by the gas processing device 19 is eventually emitted as exhaust gas to the atmosphere outside the system.

The hydrogen gas piping system 4 includes: a hydrogen tank 31 (gas supply source) that has high-pressure hydrogen gas stored inside; a feed passage 32 that supplies hydrogen gas in the hydrogen tank 31 to the fuel cell 2; a circulation passage 33 for returning hydrogen off-gas (unreacted hydrogen gas), which is emitted from the fuel cell 2, to the feed passage 32; a hydrogen pump 34 that circulates hydrogen off-gas in the circulation passage 33 to the feed passage 32; a check valve 35 that is provided in the circulation passage 33 on a downstream side of the hydrogen pump 34 and prevents back-flow of hydrogen off-gas; and an emission passage 36 that branches off from the circulation passage 33 and leads impurities contained in hydrogen off-gas and hydrogen off-gas to the gas processing device 19.

The hydrogen pump 34 is drive-controlled by the control device 5. The circulation passage 33 is connected to a junction A of the feed passage 32, and mixed gas of new hydrogen gas and hydrogen off-gas meeting each other at the junction A is supplied to the fuel cell 2. Specifically, a hydrogen gas passage 38 (fuel gas passage) for feeding hydrogen gas to the fuel cell 2 is configured by the circulation passage 33 and the passage 32. The emission passage 36 is provided with a purge valve 39. The purge valve 39 functions as a shut-off valve that opens and closes the emission passage 36. The purge valve 39 is opened and closed by the control device 5 and normally closed when the fuel cell system 1 is operated. By opening the purge valve 39, hydrogen off-gas is led to the gas processing device 19 via the emission passage 36.

The feed passage 32 is provided with, starting from the hydrogen tank 31 side: a first regulator 51 for first pressure reduction, which reduces the pressure of hydrogen gas flowing out from hydrogen tank 31; a shut-off valve 52 which opens and closes the feed passage 32; a second regulator 53 for second pressure reduction, which further reduces the pressure of hydrogen gas depressurized by the first regulator 51; and a third regulator 54 for third pressure reduction, which further reduces the pressure of hydrogen gas depressurized by the second regulator 53. Hydrogen gas with regulated pressure is supplied to the fuel cell 2 by these regulators (51, 53, and 54). It should be noted that the number of regulators is discretionary.

Further, an inlet side shut-off valve 55 for opening and closing the feed passage 32 is provided in the vicinity of an inlet side of the fuel cell 2 on the feed passage 32, and an outlet side shut-off valve 56 for opening and closing the circulation passage 33 is provided in the vicinity of an outlet side of the fuel cell 2 on the circulation passage 33. The inlet side shut-off valve 55 and the outlet side shut-off valve 56 are each opened and closed by the control device 5. Furthermore, in the hydrogen gas passage 38 constituted from the feed passage 32 and the circulation passage 33, a plurality of relief valves 57 are dispersed so as to branch from the hydrogen gas passage 38, and a plurality of pressure sensors 58 (pressure detecting means) for detecting the pressure of hydrogen gas or hydrogen off-gas in the hydrogen gas passage 38 are also dispersed.

The relief valves 57 are activated when hydrogen gas or hydrogen off-gas in the hydrogen gas passage 38 is pressurized to a predetermined pressure, and discharges hydrogen gas or hydrogen off-gas to the outside. The relief valves 57 are mechanically activated by the pressure of hydrogen gas or hydrogen off-gas, and includes, for example, a valve disc configured to be detachable with respect to a valve seat and a pressure-regulating spring that biases the valve disc toward the valve seat. When the pressure in the hydrogen gas passage 38 reaches the lowest working pressure (predetermined pressure), the valve disc resists the biasing force of the pressure-regulating spring to separate from the valve seat. Accordingly, the relief valves 57 are brought into the opened state and allow hydrogen gas or hydrogen off-gas to flow (discharging) to the gas discharge side.

In the present embodiment, the feed passage 32 is provided with two relief valves 57 and the circulation passage 33 is provided with one relief valve 57. One of the relief valves 57 provided in the feed passage 32 is disposed on a downstream side of the shut-off valve 52 and opened when the pressure of hydrogen gas in the feed passage 32 extending from the first regulator 51 to the second regulator 53 increases to a predetermined set pressure or higher. On the other hand, the other one of the relief valves 57 provided in the feed passage 32 is disposed on a downstream side of the second regulator 53 and opened when the pressure of hydrogen gas in the feed passage 32 extending from the second regulator 53 to the third regulator 54 increases to a predetermined set pressure or higher.

The relief valve 57 provided in the circulation passage 33 is disposed on a downstream side of the hydrogen pump 34 and opened when the pressure of hydrogen off-gas in the circulation passage 33 in the downstream side of the hydrogen pump 34 increases to a predetermined set pressure or higher. Furthermore, this relief valve 57 is opened when the pressure of mixed gas (hydrogen gas and hydrogen off-gas) in the feed passage 32 extending from the third regulator 54 to the fuel cell 2 via the junction A increases to the predetermined set pressure or higher.

The gas discharge side of each relief valve 57 is provided with an external discharge passage 59, and a downstream end of the external discharge passage 59 joins the emission passage 36 and is communicated to the gas processing device 19. In other words, the plurality of external discharge passages 59 are provided with a single gas processing device 19, and hydrogen gas or hydrogen off-gas discharged from the plurality of relief valves 57 passes through each external discharge passage 59 to flow into the single gas processing device 19. It should be noted that the number of relief valves 57 and the number of the pressure sensors 58 are discretionary. In the present embodiment four pressure sensors 58 are provided, wherein three of them are provided in the vicinity of the upstream side of the relief valves 57, and one is provided in the feed passage 32 on the downstream side of the junction A.

The gas processing device 19 reduces the concentration of hydrogen gas or hydrogen off-gas discharged from the relief valves 57 or the purge valve 39 (abbreviated to "relief gas" hereinafter) by using oxygen off-gas. The gas processing device 19 is constituted by the diluting device that reduces the concentration of hydrogen in relief gas by, for example, mixing oxygen off-gas and relief gas. Alternatively, the gas processing device 19 is constituted by the oxidation device that reduces the concentration of hydrogen in relief gas by, for example, oxidizing relief gas with oxygen off-gas (combustion process). Exhaust gas, which is processed by the gas processing device 19, is emitted into the atmosphere outside the system.

It should be noted that the diluent gas for reducing the concentration of relief gas introduced to the gas processing device 19 is not limited to oxygen off-gas. For example, as this type of diluent gas, oxygen gas, which is pumped from the compressor 12 to the fuel cell 2 via the feed passage 14, can be used, or secondary air, which is not fed to the fuel cell 2, or inert gas such as or nitrogen can be used. Above all, use of oxygen gas (oxygen off-gas) fed in the fuel cell 2 does not complicate the fuel cell system 1, as in the present embodiment.

As described above, according to the fuel cell system 1 of the present embodiment, even in the case where the pressure of hydrogen gas or hydrogen off-gas increases to abnormal pressure due to problems such as a failure of the regulators (51, 53, and 54) of the hydrogen gas piping system 4, excess pressure of hydrogen gas or hydrogen off-gas can be allowed to escape since the relief valves 57 are provided in the hydrogen passage 38. Accordingly, damage to the fuel cell 2 due to abnormally increased pressure in the hydrogen gas piping system 4 and damage to the system components can be prevented appropriately. Moreover, since relief gas, such as hydrogen gas discharged from the relief valves 57, is processed by the gas processing device 19, eventually relief gas at a safe concentration can be emitted appropriately into the atmosphere.

Embodiment 2

Next, the fuel cell system 1 according to Embodiment 2 is described with reference to FIGS. 1 to 3. In the present embodiment the system components are controlled in connection with discharge of relief gas caused by the relief valves 57.

Figure 2:
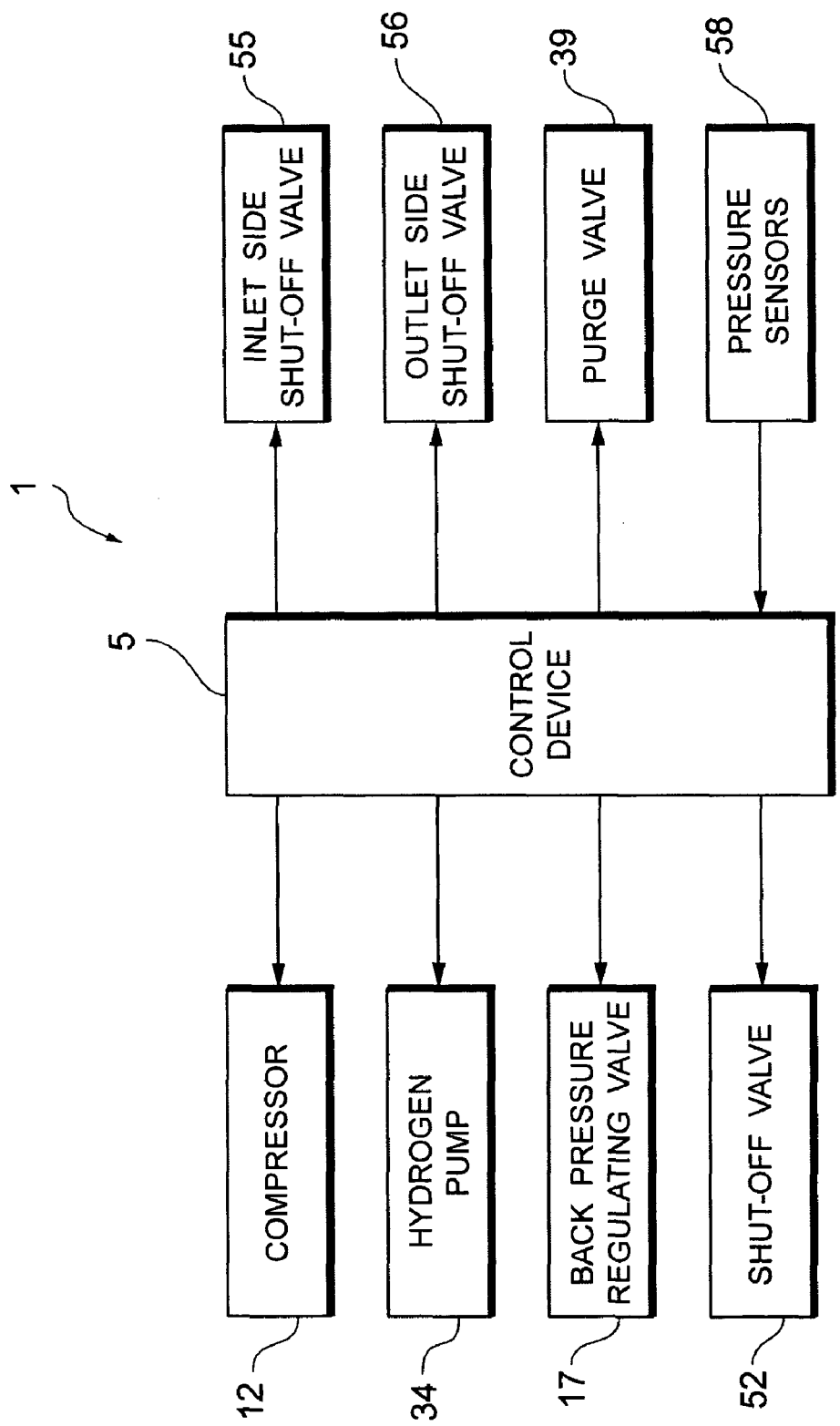
FIG. 2 is a block diagram showing a control configuration of the fuel cell system according to Embodiment 1.

The control device 5 (ECU) shown in FIG. 2 has, although not shown, a CPU, a ROM that stores a control program or control data processed by the CPU, a RAM that is used as various work areas for mainly performing control processing, and an I/O interface, and these are connected to one another via a bus. Various drivers for driving the motor 21 of the compressor 12, hydrogen pump 34, back pressure regulating valve 17, shut-off valve 52, inlet side shut-off valve 55, outlet side shut-off valve 56, purge valve 39 and the like, and the plurality of pressure sensors 58 are connected to the I/O interface.

According to the above construction, the CPU inputs a detection signal of each pressure sensor 58 via the I/O interface in accordance with the control program inside the ROM, processes various data and the like inside the RAM, and then outputs a control signal to the various drivers via the I/O interface, thereby controlling the entire fuel cell system 1.

Figure 3:
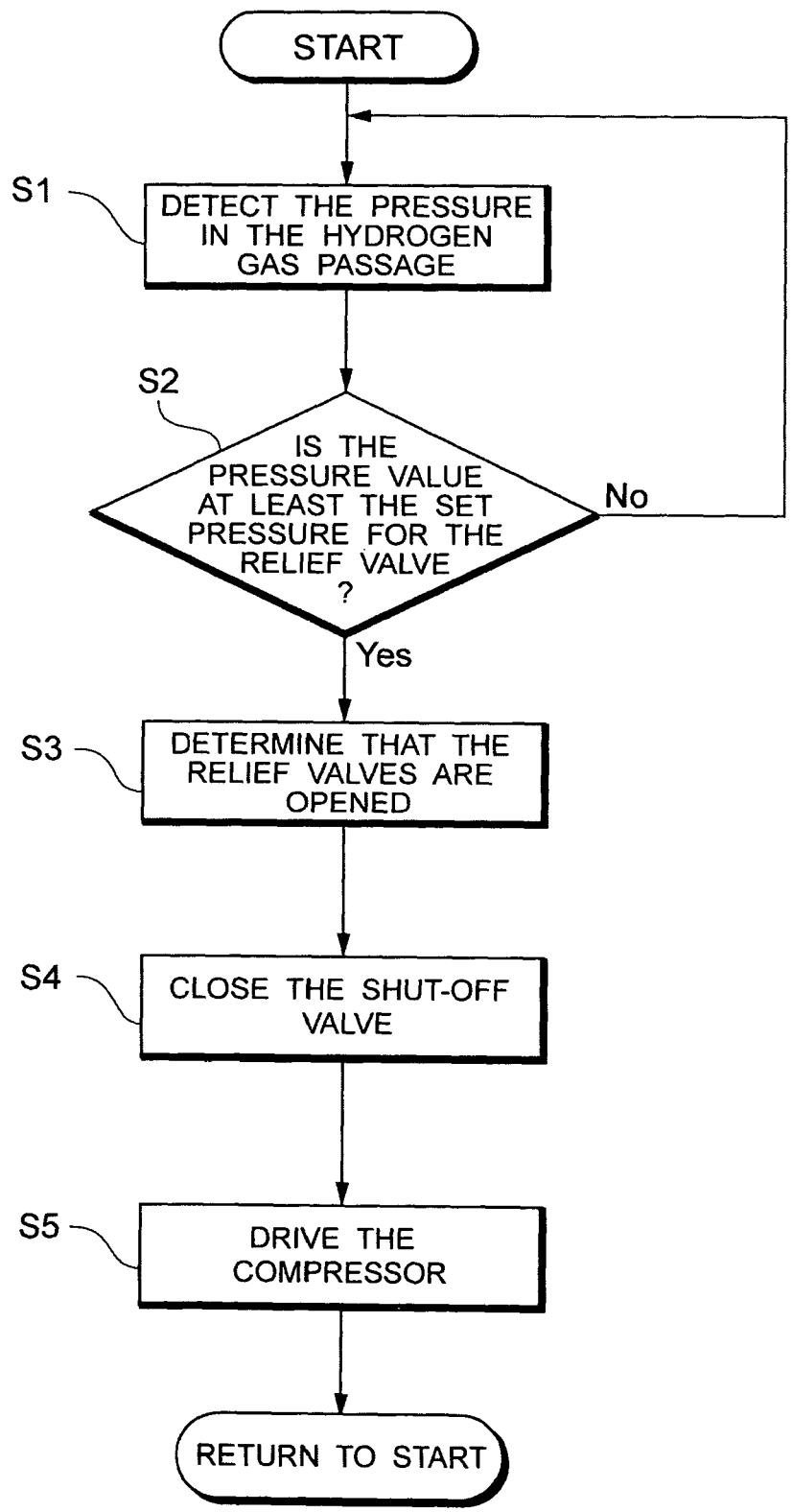
FIG. 3 is a flowchart showing a control flow of the fuel cell system according to Embodiment 2.

As shown in, for example, FIG. 3, while the fuel cell system 1 is in operation, the plurality of pressure sensors 58 appropriately detect the pressure in the hydrogen gas passage 38 (S1). When the pressure detected by the pressure sensors 58 is at least operation starting pressure (predetermined pressure) for the relief valves 57 (S2), the control device 5 assumes (determines) that the relief valves 57 are already opened and relief gas is being discharged (S3). For example, if the pressure sensor 58 on the downstream side of the second regulator 53 detects that the pressure of hydrogen gas in the feed passage 32 is at least the operation starting pressure for the relief valve 57 in the vicinity of this pressure sensor 58, the control device 5 determines that this relief valve 57 is opened.

Then, when the control device 5 determines that the relief valve 57 is opened, the control device 5 controls the closing of the shut-off valve 52 that is on the downstream side of the hydrogen tank 31 and on the upstream side of all of the relief valves 57 (S4). Accordingly, since the shut-off valve 52 as a source valve of the hydrogen tank 31 is closed, hydrogen gas can be prevented from further flowing out to the feed passage 32 from the hydrogen tank 31, and relief gas can be discharge appropriately and promptly from the relief valve 57.

Further, the control device 5 controls the compressor 12 so as to increase the rotation speed of the motor 21 of the compressor 12 (S5). Accordingly, the flow volume of oxygen gas pumped to the fuel cell 2 and the flow volume of oxygen off-gas emitted from the fuel cell 2 increase. As a result, the flow volume of oxygen off-gas led to the gas processing device 19 also increases, and the concentration of relief gas can be reliably reduced using oxygen off-gas in the gas processing device 19.

At this moment, the drive control of the compressor 12 can change the rotation speed of the motor 21 of the compressor 12 based on the size of a value detected by the pressure sensors 58, but the motor 21 may be driven at the maximum rotation speed regardless of the size of the detected value. Above all, in either case, the differential pressure between anode and cathode of the fuel cell 2 is preferably kept within a predetermined range by adjusting the degree of opening of the back pressure regulating valve 17 by means of the control device 5.

It should be noted that, in place of using the configuration of the present embodiment, Step 5 (S5) may be started prior to the abovementioned Step 4 (S4). Moreover, in the case where the control device 5 determines in Step 3 (S3) that the relief valves 57 are opened, it is preferred that the control device 5 controls the opening of both inlet side shut-off valve 55 and outlet side shut-off valve 56 reliably. Further, in Step 3 (S3), the control device 5 controls the opening of the purge valve 39 to discharge hydrogen off-gas from the purge valve 39, whereby the excess pressure state in the hydrogen gas piping system 4 can be brought back to a predetermined pressure state promptly.

Moreover, in the present embodiment, when the pressure detected by the pressure sensors 58 is at least the operation starting pressure of the relief valves 57, Step 4 (S4) and Step 5 (S5) are performed. However, instead, Step 4 and Step 5 may be performed when the pressure sensors 58 detect the predetermined pressure that is lower than the operation starting pressure for the relief valves 57. When focusing attention on, for example, Step 5, considering the propagation speed of oxygen gas, the amount of operation operated by the compressor 12 can be increased prior to the operation starting pressure for the relief valves 57. Specifically, the present embodiment includes controlling the drive of the compressor 12 and the closing of the shut-off valve 52 when the pressure sensor 58 detects that the pressure of relief gas corresponds to the predetermined pressure for the relief valves 58.

Embodiment 3

Next, the fuel cell system 1 according to Embodiment 3 is described with reference to FIG. 4. In the present embodiment, when the pressure in the hydrogen gas passage 38 abnormally increases, the purge valve 39 is opened prior to starting an operation of the relief valves 57. The control device 5 controls opening and closing of the purge valve 39 based on the results of detection performed by the plurality of pressure sensors 58. However, the control starting pressure (reference pressure), which is for the control of opening the purge valve 39 by means of the control device 5 in the case of abnormally increased pressure, is set lower than the operation starting pressure for the relief valves 57.

Figure 4:
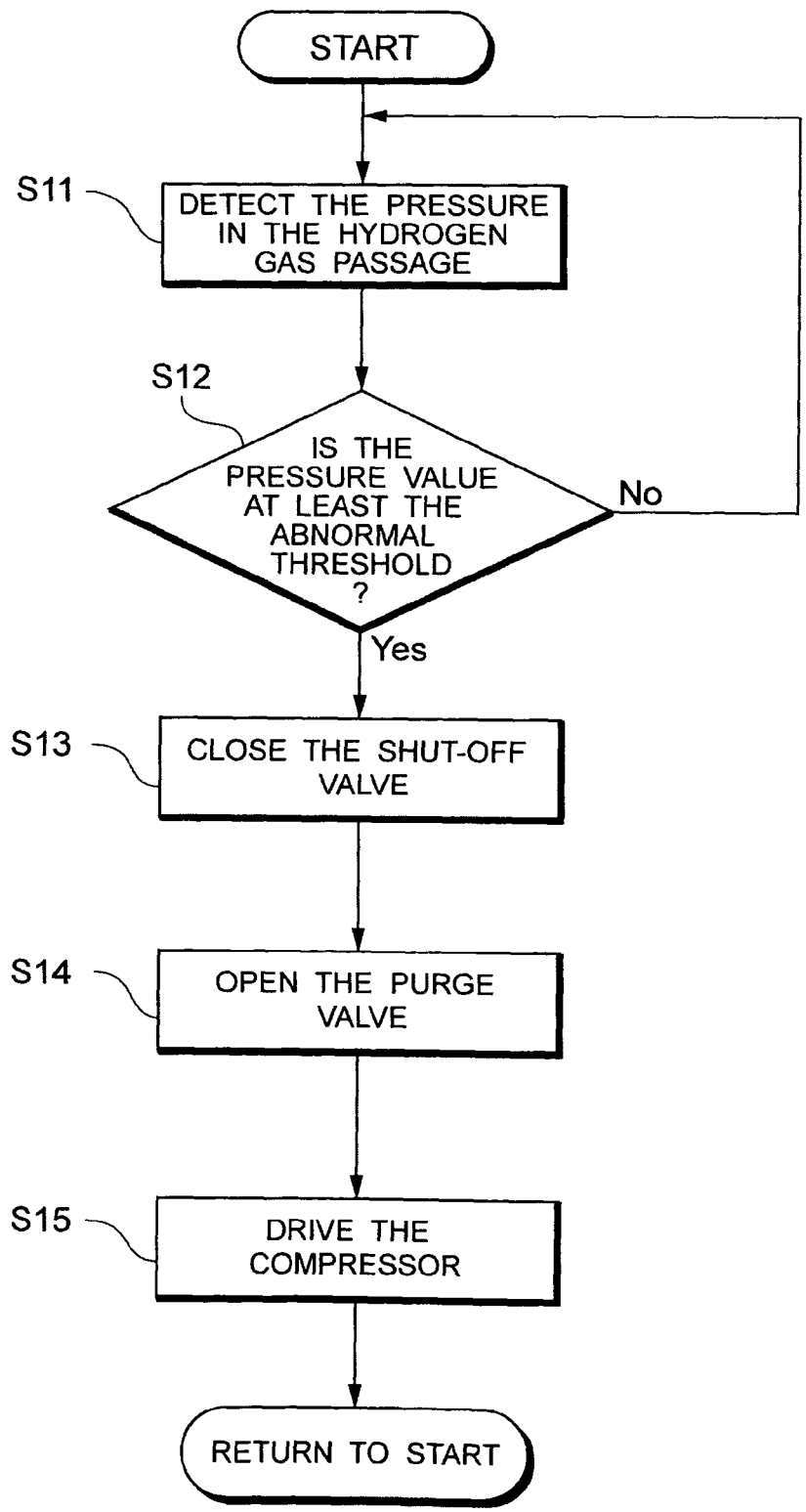
FIG. 4 is a flowchart showing a control flow the fuel cell system according to Embodiment 3.

As shown in FIG. 4, while the fuel cell system 1 is in operation, the plurality of pressure sensors 58 appropriately detect the pressure in the hydrogen gas passage 38 (S11). In the case where the pressure in the hydrogen gas passage 38 increases to an abnormal threshold or higher, i.e., in the case where a pressure value detected by the pressure sensors 58 is at least the control starting pressure of the purge valve 39 (S12), the control device 5 to which the detected signal is inputted controls the closing of the shut-off valve 52 (S13) and controls the opening of the purge valve 39 (S14). By bringing the purge valve 39 to the opened state, hydrogen off-gas in the circulation passage 33 is discharged to the emission passage 36, thus the excess pressure can be appropriately allowed to escape.

At this moment, the control device 5 may control the opening of the purge valve 39 so that the purge valve 39 intermittently repeats opening and closing, or may control the opening of the purge valve 39 only for a predetermined time period enough for allowing the excess pressure to escape. Then, in synchronization with control of the opening of the purge valve 39, by drive-controlling the motor 21 of the compressor 12 by means of the control device 5 (S15), in the gas processing device 19 hydrogen off-gas, which is led from the emission passage 36 when the purge valve 39 is opened, can be reliably processed using oxygen off-gas. It should be noted at this moment that the compressor 12 can be drive-controlled by driving the motor 21 at the maximum rotation speed or by changing the rotation speed of the motor 21 according to the operation condition of the purge valve 39. In the later case, the rotation speed of the motor 21 may be changed according to, for example, time intervals in which the purge valve 39 is opened and closed, the number of operations of opening and closing, the time at which the purge valve 39 is opened, and the like.

As described above, according to the present embodiment, the purge valve 39 is opened when the pressure in the hydrogen gas passage 38 increases abnormally, thus damage to the fuel cell 2 and the system components, which is caused by abnormally increased pressure, can be prevented appropriately. Further, the concentration of hydrogen off-gas discharged from the purge valve 39 is subjected to reduction processing by the gas processing device 19, thus eventually relief gas at a safe concentration can be emitted into the atmosphere appropriately. Moreover, in the case where the increase of the pressure cannot be prevented even by means of a series of control including the opening and closing of the purge valve 39 as described above, and where the pressure in the hydrogen gas passage 38 reaches the operation starting pressure for the relief valves 57, the relief valves 57 are mechanically activated and opened. Therefore, the excess pressure in the hydrogen gas passage 38 can be reliably allowed to escape. In other words, fail safe can be optimally achieved.

It should be noted that, prior to Step 14 (S14) in which the purge valve 39 is opened, it is preferred that the control device 5 controls the opening and closing of both inlet side shut-off valve 55 and outlet side shut-off valve 56 reliably. Further, as with Embodiment 2, when drive-controlling the compressor 12 (S15), it is preferred that the control device 5 adjust the degree of opening of the back pressure regulating valve 17 to keep the differential pressure between anode and cathode of the fuel cell 2 within a predetermined range.

The invention claimed is:

1. A fuel cell system comprising:
   a fuel gas passage that feeds fuel gas to a fuel cell;
   a relief valve provided in the fuel gas passage, the relief valve discharging fuel gas to the outside when fuel gas in the fuel gas passage is pressurized to an operation starting pressure for the relief valve or higher;
   an emission passage emitting fuel gas, which is discharged from the fuel cell, to the outside;
   a purge valve provided in the emission passage, the purge valve opening and closing the emission passage;
   a gas processing device provided on the downstream side of the purge valve in the emission passage, the gas processing device reducing the concentration of fuel gas;
   pressure detecting means provided in the fuel gas passage, for detecting the pressure of fuel gas in the fuel gas passage; and
   a control device configured to open and close the purge valve based on the pressure detecting means, wherein the control device is further configured to open the purge valve when the pressure detecting means detects a reference pressure that is set lower than the operation starting pressure of the relief valve.

2. The fuel cell system according to claim 1, further comprising:
   an external discharge passage provided on a gas discharge side of the relief valve,
   wherein the external discharge passage joins the emission passage on the upstream side of the gas processing device.

3. The fuel cell system according to claim 1, wherein the gas processing device is configured to be able to introduce diluent gas for reducing the concentration of fuel gas.

4. The fuel cell system according to claim 3, wherein the diluent gas is oxygen gas fed to the fuel cell.

5. The fuel cell system according to claim 4, further comprising:
   oxygen gas supply means for pumping gas to the fuel cell, wherein the control device drives the oxygen gas supply means to introduce oxygen gas to the gas processing device in synchronization with control of the opening of the purge valve.

6. The fuel cell system according to claim 1, further comprising:
   a gas supply source provided at the upstream end of the fuel gas passage, the gas supply source having fuel gas stored inside; and
   a shut-off valve provided in the fuel gas passage on the downstream side of the gas supply source, the shut-off valve being opened and closed by the control device, wherein the control device also controls the closing of the shut-off valve when the pressure detecting means detects the reference pressure.

* * * * *